April 8, 1969     E. K. NOWAK ET AL     3,436,886
FRAME MOUNTING IN WALL PANEL SYSTEM
Filed Jan. 23, 1967     Sheet 1 of 2

INVENTORS
ERVIN K. NOWAK
LUTHER W. GRAEF

BY Wheeler, Wheeler, House & Clemency
ATTORNEYS

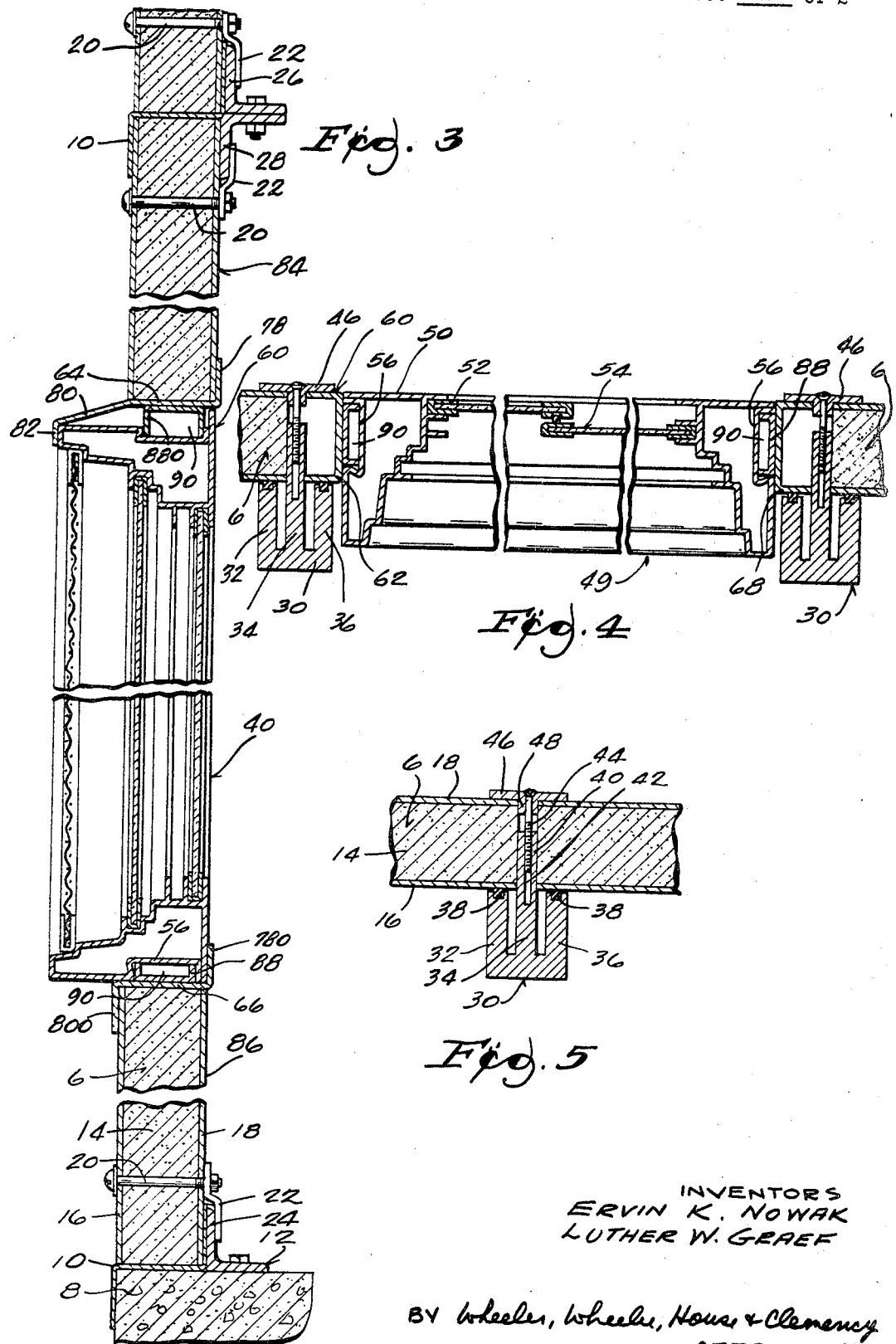

United States Patent Office 3,436,886
Patented Apr. 8, 1969

3,436,886
FRAME MOUNTING IN WALL PANEL SYSTEM
Ervin K. Nowak, Greendale, and Luther W. Graef, Milwaukee, Wis., assignors to Commercial Builders Corp., Greendale, Wis., a corporation of Wisconsin
Filed Jan. 23, 1967, Ser. No. 611,027
Int. Cl. E06b *3/04, 1/14;* E04c *2/38*
U.S. Cl. 52—208      10 Claims

ABSTRACT OF THE DISCLOSURE

A subframe integrated with a panel wall system to mount a door or window or a set of frame components is adapted to transfer wind loads or transfer shear forces across the item mounted in the frame to the strut or girt framing of the panel wall. The subframe has integral flanges on the inside and outside of the wall for interlocking engagement with panels in lieu of weather stripping and flashing. It is normally set into the panel wall system at the time of initial construction but may be moved, replaced or interchanged anywhere in the wall at any time and without special tools, skill, or training.

Background of the invention

In most panel walls, installations of windows, doors, ventilators or the like are costly. They are frequently not weatherproof. The items mounted commonly lose heat to such an extent as to destroy much of the insulation value of the wall. Once the items are installed in the wall, it becomes difficult and expensive to move or replace them. In contrast, the instant invention provides a simple and effective interlock with wall panels above, below and at the sides of the subframe. The arrangement is such that the assembly is weathertight and has material thermal insulation and yet may be removed readily and replaced by a fixed panel or by a different window or a door or other construction.

For purposes of exemplifying the invention, reference will be made hereinafter to the installation of windows in a subframe, it being understood that door frames or ventilator frames can be similarly installed in appropriately sized subframes for the purpose of the present invention.

Conventionally, openings are cut in such panels where windows are desired and the windows are then installed and sealed in whatever manner is termed appropriate by the contractor. While subframes for conventional industrial windows have been developed, they have not been related to panel wall construction or used to produce uniform window mounting and sealing.

Summary of the invention

In a panel wall which is essentially modular, a subframe corresponding in width to the panels serves as an adapter to fit a frame assembly of any desired type into the wall at any point. The generally rectangular subframe has a side which is removable and readily replaceable to receive or release the structure to be mounted and to interlock this securely with the strut grit framing and with panels above or below the subframe. The subframe carries its own sealing and weather-stripping flanges to interlock with panel sections above and below it and to permit the subframe to be inserted or removed readily without tools and to transfer loads around the window which it carries. The subframe units provide complete flexibility. Either windows or doors or other units may be moved or replaced or interchanged anywhere in the wall either at the time of erection or at any time thereafter. In addition, inserted units may be stacked vertically or aligned horizontally to provide any desired pattern of fenestration. Mounting the subframe and its contained unit requires no mechanical fasteners or adhesives of any kind although, if desired, the subframe can be fastened in the same manner as the adjacent wall panels, if these are fastened.

Brief description of the drawings

In the drawings:

FIG. 3 is an enlarged fragmentary detail view in section on the line 3—3 of FIG. 1.

FIG. 4 is an enlarged fragmentary detail view in section on the line 4—4 of FIG. 1.

FIG. 5 is a fragmentary detail view in perspective on the line 5—5 of FIG. 1.

Description of preferred embodiment

Figure 1:
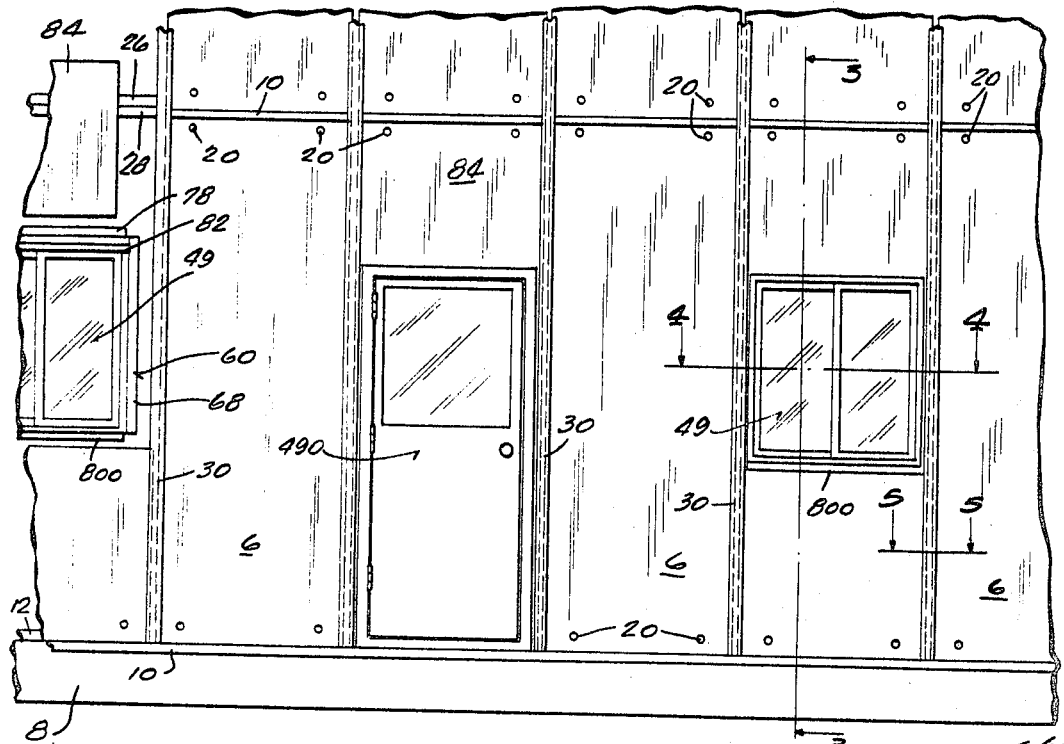
FIG. 1 is a fragmentary detail view in elevation showing the partially completed inner side of a panel wall embodying the invention.

In the panel wall structure shown, a series of prefabricated wall panels 6 are supported from the foundation 8 on interposed flashing 10 which is desirably Z-shaped in cross section as best shown in FIG. 3. Usually such panels are four feet wide and eight to ten feet high. Angle 12 bolted to the foundation is abutted by the flashing and provides a back stop for the panels 6. While the panel 6 may be of any desired structure, those commonly used include a nonmetallic core 14 which desirably has thermal insulation properties and which is enclosed between facing sheets 16 and 18. Bolts 20 passing through the lower end portions of the respective panels secure clips 22 which embrace the upwardly extending flanges 24 of the angles 12 to secure the respective panels against outward movement with respect to the foundation.

Conventionally, the panels 6 are of uniform height, being connected in vertical series to horizontal girt angles 26 and 28 which are bolted together as best shown at the top of FIG. 3 and to which the superimposed panels are held by clips 22 and bolts 20 with interposed flashing 10.

Between laterally adjacent panels 6, it is conventional to have vertical struts. A typical installation is shown in FIG. 5. In cross section the outer strut element 30 has legs 32, 34 and 36. Legs 32 and 36 have seal strips 38 engaging the outer skins 16 of the respective panel 6 adjacent their respective side margins. The leg 34 is extended at 40 between the side margins of the panels and has tapped openings 42 which receive screws 44 which extend through the wall system to hold the inner strut members 46 in positions which span the space between panels. These may have central flanges 48 corresponding in width to the flanges 40 and interposed between the side margins of the panels at the inside of the wall.

The window 49 represents one conventional commercial design. It includes a hollow frame 50 having channels for glazed sash 52, 54 and shouldered to receive screen or storm sash if desired. Such details form no part of the present invention. It is intended that the window 49 shall represent any unit which it may be desired to mount by means of the subframe herein disclosed. Doors, louvers and other ventilators are further examples. For illustration, a door is shown at 490 in FIG. 1.

The conventional window frame 50 is provided externally with channels 56 which, in a different type of wall, are adapted normally to receive studs or the like. In accordance with the present invention, a complete window of this or any other desired type is mounted in a subframe generically designated by reference character 60 and which corresponds in width with one of the panels 6 and is big enough to receive the window and is strong enough, structurally, to provide support for superimposed panel elements without requiring the weight of such elements to be carried by the window frame 50.

Figure 2:
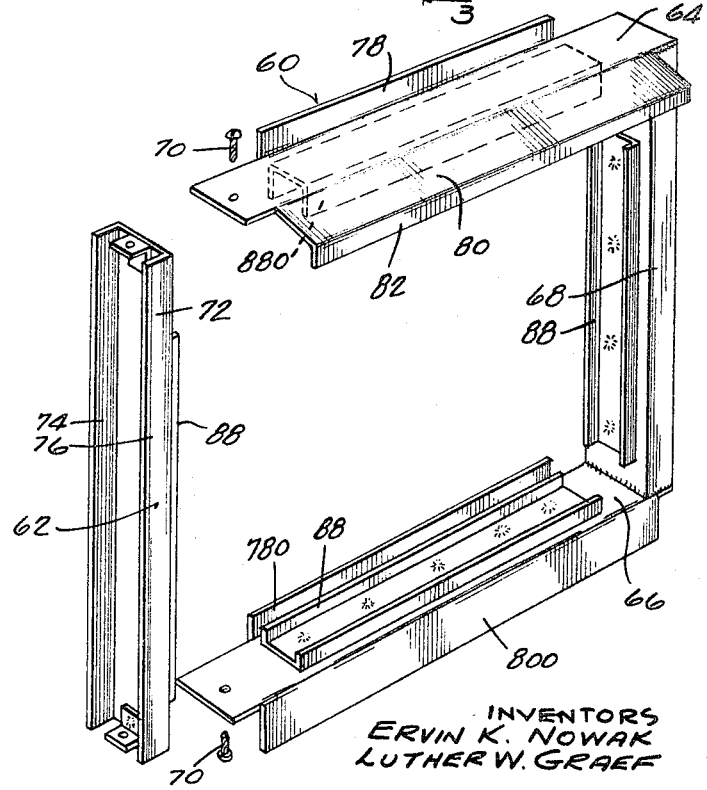
FIG. 2 is an enlarged view in perspective showing a subframe made in accordance with the invention as it appears with one side wall disassembled to receive a window.

The subframe is generally rectangular, having vertical side members 62 and 68 and top and bottom sides 64 and 66. The side 62 is desirably easily removable to facilitate introduction or replacement of windows. The upper and lower sides 64 and 66 are welded to the other vertical side 68 as shown in FIG. 2 but the connection of the removable side 62 to the sides 64 and 66 is desirably made by fasteners such as bolts or screws 70 for which openings are provided in the parts.

Each of the lateral sides of the subframe preferably comprises a channel 72. The channels at opposite sides of the subframe have their side flanges 74 and 76 oppositely directed. The flanges of each such channel are spaced to correspond precisely with the thickness of the wall panel 6 with which it is to be used. Thus, as shown in FIG. 4, one of the external strut members 30 and one of the internal strut members 46 can be connected by bolts 44 between the contiguous sides of a panel 6 and a channel 62 of the subframe. The resulting connection between the subframe and the panels 6 laterally adjacent thereto will be identical with the connection that would be made to an intervening panel if the subframe were not present.

That side of the subframe which is uppermost (this being the side 64 in FIGS. 2 and 3) is a plate having an integral upwardly extending inner flange 78 and a flange 80 projecting in a direction with a downward component. In practice, the downwardly inclined flange 80 terminates in a depending skirt at 82 which overhangs the window frame at the outside of the wall system. The upwardly extending flange 78 abuts the fractional panel 84 which may be superimposed on the subframe. It will be understood that there may also be a fractional panel 86 beneath the subframe as shown in FIG. 1. The connections of these fractional panels to the girt and strut framing will be the same as if full panels were being installed.

The lower side member 66 of the subframe similarly has an upstanding flange 780 and a depending flange 800. These are respectively engaged with the inside of the window frame 50 and with the outside of the underlying panel or panel section 6 or 86, as the case may be (FIGS. 2 and 3).

Each of the several sides of the subframe is provided with channels 88 and 880 having inwardly projecting flanges as best shown in FIG. 2. These are designed dimensionally to fit the externally opening channels 56 of the window frame 50, thus producing closed thermally-insulating air spaces 90. The flanges 880 are slightly longer because there is additional space above the window frame to accommodate the inclination of the seal flange 80 as best shown in FIG. 3.

The window frame will simply slide into the partially assembled subframe comprising sides 64, 66 and 68 thereof, after which the side 62 is attached to sides 64 and 66 to complete the enclosure of the window.

In the course of installation, the workmen will cut fractional panels 86 to the desired height and, to seat a subframe upon each one, will simply hook the flange 800 over the outside of the fractional panel. The subframe and window are then pivoted into the plane of the wall. With the subframe vertical, the top fractional panel 84 will seat on top of the subframe. Thereupon the application of the strut members 30 and 46 will complete the connection of the respective subframes to the rest of the wall structure.

It will be observed that simply by removing the strut members 46 at the inside of the wall and at opposite sides of any given subframe, the subframe will be free to pivot on the underlying panel section 86 and may be removed into the interior of the building. This will expose its removable side 62 for disconnection from the rest of the subframe, whereupon the window can be slid out and replaced, for example, by a different type or style of window. Replacement is equally simple.

Similarly, the removal of a subframe and panel sections above and below it will make possible the substitution of panel sections of respectively different height to locate the window at a different level. It will be understood that the total height of subframe and fractional panels will normally equal the height of an uncut panel. However, this is not necessarily the case if each assembly or panel reaches the same girt.

Likewise, a subframe may be designed to equal the extent of two panels to take a wider window or set of windows.

We claim:
1. In a wall panel system having prefabricated panel units in a grid of strut and girt framing, the improvement which consists in the combination with at least one fractional panel fitted between laterally spaced struts in said grid, of a subframe including top, bottom and lateral side members, and a unit frame interlocked with the subframe and housed therein and connected unitarily therewith to spaced struts and to said fractional panel.

2. A combination according to claim 1 in which the subframe has its lateral side members comprised of upright channels having oppositely projecting flanges and overall thickness equal to the wall panels, said channels being engaged between strut members which are also fitted respectively to laterally adjacent wall panels.

3. A combination according to claim 2 in which the top and bottom side members of the subframe are each provided with flanges extending upwardly at the inside of the wall system and downwardly at the outside thereof.

4. A combination according to claim 3 in which all four side members of the subframe comprise channels with flanges complementary to and fitted into channels with which the unit frame is provided, at least one side member of the subframe being detachably connected with contiguous adjacent side members thereof to permit insertion and removal of said unit frame.

5. In a wall panel system having prefabricated panel units in a grid of strut and girt framing, the improvement which consists in the combination with at least one fractional panel fitted between laterally spaced struts in said grid, of a subframe including top, bottom and lateral side members, and a unit frame interlocked with the subframe and housed therein and connected unitarily therewith to spaced struts and to said fractional panel, the struts of said system comprising inner and outer elements having screwthreaded means detachably connecting said elements with each other and disposed between panels, said inner elements lapping laterally adjacent panels interiorly and the outer elements lapping the panels exteriorly of the wall system, there being fractional panels and an intervening subframe of like thickness between two laterally spaced struts, the total of said fractional panels and subframe being substantially equal to the total height of next consecutive panels in said system, the subframe lateral side members constituting channels with oppositely directed flanges engaged by the inner and outer elements of adjacent struts, said elements having means connecting them and holding them in pressure engagement with the inner surfaces of the subframe sides and the corresponding inner surfaces of laterally adjacent panels, the top and bottom side members of the subframe comprising plates, each of which is provided interiorly of the wall system with an upstanding flange and exteriorly of the wall system with a flange having a downward component of direction, one of the lateral side members of the subframe being detachably connected with top and bottom side members thereof, said unit frame having channels engaged by inwardly directed flanges of channels with which the several side members of the subframe are provided.

6. A system according to claim 5 in which the unit frame comprises a window frame in which at least one window sash is assembled.

7. In a wall panel system having a grid of strut and girt framing with openings of substantially uniform size in width and height, the combination with said grid of a plurality of prefabricated panel uints fitting certain of said openings and connected with said strut and girt framing, at least one fractional panel in one said opening fitted between laterally spaced struts of said grid, a subframe including top and bottom and lateral side members in the last said opening abutting said fractional panel and extending between the struts at each side of said opening and connected therewith, a unit frame, the unit frame and subframe having rib and channel means interlocked in engagement with top, bottom and lateral side members of the subframe and connected by the subframe with the last mentioned struts and with said fractional panel, at least a plurality of the members of said subframe being permanently connected with each other and at least one of the said subframe members being detachably connected with the two others of said members whereby to give access for the insertion in and removal from the subframe of the aforesaid unit frame, the unit frame slidable along certain of said rib and channel means to and from interlocked engagement in the subframe when said one subframe member is detached, and a sash mounted in the unit frame and thereby mounted in said system.

8. A wall panel system according to claim 7 in which the member of the subframe which is detachable is at the side of the subframe and the unit frame is slidable between the top and bottom members of the subframe when said detachable side member is disconnected.

9. A wall panel system according to claim 7 in which the subframe has flashing interposed between it and said fractional panel and including one flange extending downwardly exteriorly and another flange extending upwardly interiorly.

10. A wall panel system according to claim 7 in which the unit frame comprises members having outwardly opening channels, the subframe members having inwardly projecting channel elements interlocking engaged in the channels of the unit frame members.

References Cited

UNITED STATES PATENTS

| | | | |
|---|---|---|---|
| 2,244,649 | 6/1941 | Carpenter et al. | 52—215 X |
| 2,356,730 | 8/1944 | Auten | 52—211 |
| 2,813,311 | 11/1957 | Vaughn | 52—215 |
| 3,052,330 | 9/1962 | Hammitt et al. | 52—464 X |
| 3,239,976 | 3/1966 | Hall | 52—656 X |

ALFRED C. PERHAM, *Primary Examiner.*

U.S. Cl. X.R.

52—211, 464, 656